(12) United States Patent
Agarwal et al.

(10) Patent No.: US 11,976,955 B2
(45) Date of Patent: May 7, 2024

(54) PORTABLE FLUID LEVEL MONITORING DEVICE AND METHOD

(71) Applicant: Ecolab USA Inc., St. Paul, MN (US)

(72) Inventors: Ashish Agarwal, Winfield, IL (US); Brandon M. Davis, Oswego, IL (US); William Von Drasek, Oak Forest, IL (US); Divigar Lakshmanan, Villupuram (IN)

(73) Assignee: Ecolab USA Inc., St. Paul, MN (US)

( * ) Notice: Subject to any disclaimer, the term of this patent is extended or adjusted under 35 U.S.C. 154(b) by 110 days.

(21) Appl. No.: 16/538,320

(22) Filed: Aug. 12, 2019

(65) Prior Publication Data

US 2020/0096377 A1 Mar. 26, 2020

Related U.S. Application Data (60) Provisional application No. 62/734,276, filed on Sep. 21, 2018.

(51) Int. Cl.
*G01F 22/00* (2006.01)
*G01F 23/26* (2022.01)
(Continued)

(52) U.S. Cl.
CPC .............. *G01F 22/00* (2013.01); *G01F 23/26* (2013.01); *G01F 23/284* (2013.01); *G01F 23/292* (2013.01); *G01F 23/296* (2013.01)

(58) Field of Classification Search
CPC ........ G01F 22/00; G01F 23/26; G01F 23/284; G01F 23/292; G01F 23/296
(Continued)

(56) References Cited

U.S. PATENT DOCUMENTS 3,120,757 A 2/1964 Smith
3,161,050 A * 12/1964 Exner .................. G01F 23/246
  73/290 R (Continued)

FOREIGN PATENT DOCUMENTS

AU 2008100552 A4 10/2008
BE 1010791 A6 2/1999
(Continued)

OTHER PUBLICATIONS

The disclosure of the U.S. Appl. No. 62/725,888 (Year: 2018).*
(Continued)

*Primary Examiner* — Alexander A Mercado
*Assistant Examiner* — Rodney T Frank
(74) *Attorney, Agent, or Firm* — Fredrikson & Byron, P.A.

(57) ABSTRACT

Disclosed are devices and methods for determining a fluid level of and the amount of fluid remaining in a container. A portable measuring device can include a housing, a sensor, and a measurement system. The sensor can be supported by the housing and can detect a fluid level of the container. The measurement system can be configured to receive information including a measurement of the container, to determine an amount of fluid in the container based on a measurement of the container and a detected fluid level of the container, and to output the amount of fluid in the container and geometric information of the container. A method can include supplying such a device, placing the device proximal to or in abutment with and moving the device along an outer surface of the container, providing a signal to a user, and outputting the amount of fluid in a container.

14 Claims, 9 Drawing Sheets

(51) Int. Cl.
  *G01F 23/284* (2006.01)
  *G01F 23/292* (2006.01)
  *G01F 23/296* (2022.01)
(58) Field of Classification Search
  USPC .......................................................... 73/149
  See application file for complete search history.

(56) References Cited

U.S. PATENT DOCUMENTS

| | | | |
|---|---|---|---|
| 3,206,979 | A | 9/1965 | Banks |
| 4,169,377 | A | 10/1979 | Scheib |
| 4,280,126 | A | 7/1981 | White |
| 4,762,992 | A | 8/1988 | Gat et al. |
| 5,017,909 | A | 5/1991 | Goekler |
| 5,121,631 | A | 6/1992 | Koon |
| 5,303,585 | A * | 4/1994 | Lichte ............... G01F 25/0061 367/908 |
| 5,321,630 | A | 6/1994 | Torimoto et al. |
| 5,377,114 | A | 12/1994 | Gross |
| 5,385,044 | A | 1/1995 | Thomas et al. |
| 5,400,253 | A | 3/1995 | O'Connor |
| 5,532,687 | A | 7/1996 | Richardson et al. |
| 5,707,590 | A | 1/1998 | Thomas et al. |
| 6,124,794 | A | 9/2000 | Furber et al. |
| 6,423,213 | B1 | 7/2002 | Mazurek |
| 6,879,966 | B1 | 4/2005 | Lapsley et al. |
| 7,091,868 | B2 | 8/2006 | Ku et al. |
| 7,966,879 | B2 | 6/2011 | Dietz et al. |
| 8,195,590 | B1 | 6/2012 | Coggins et al. |
| 8,590,375 | B2 | 11/2013 | Farmanyan |
| 8,761,910 | B1 | 6/2014 | Chapman, Jr. et al. |
| 8,761,911 | B1 | 6/2014 | Chapman et al. |
| 8,842,874 | B1 | 9/2014 | Alphenaar et al. |
| 8,933,789 | B1 | 1/2015 | Fink et al. |
| 8,985,468 | B1 | 3/2015 | Fink et al. |
| 9,031,689 | B1 | 5/2015 | Fink et al. |
| 9,163,974 | B1 | 10/2015 | Kekäläinen |
| 9,170,246 | B2 | 10/2015 | Dietz et al. |
| 9,305,252 | B1 | 4/2016 | Fink et al. |
| 9,336,421 | B1 | 5/2016 | Fink et al. |
| 10,068,467 | B1 | 9/2018 | Pennebaker, III |
| 2001/0000535 | A1 | 4/2001 | Lapsley et al. |
| 2002/0107645 | A1 | 8/2002 | Uzzo et al. |
| 2003/0028336 | A1 | 2/2003 | Masar et al. |
| 2003/0074957 | A1 | 4/2003 | Lemecha et al. |
| 2003/0074972 | A1 | 4/2003 | Meyer et al. |
| 2003/0075698 | A1 | 4/2003 | Shi et al. |
| 2003/0089335 | A1 | 5/2003 | Shi et al. |
| 2003/0090161 | A1 | 5/2003 | Marlow et al. |
| 2003/0095675 | A1 | 5/2003 | Marlow et al. |
| 2003/0099426 | A1 | 5/2003 | Baker et al. |
| 2004/0065148 | A1 | 4/2004 | Ham |
| 2004/0084359 | A1 | 5/2004 | Pasko |
| 2005/0040958 | A1 | 2/2005 | Holzman et al. |
| 2005/0083197 | A1 | 4/2005 | Glenn et al. |
| 2005/0137752 | A1 | 6/2005 | Alvarez |
| 2005/0159905 | A1 | 7/2005 | Bond et al. |
| 2005/0187843 | A1 | 8/2005 | Lapsley et al. |
| 2006/0005312 | A1 | 1/2006 | Reddy et al. |
| 2006/0028335 | A1 | 2/2006 | Glenn et al. |
| 2006/0028336 | A1 | 2/2006 | Glenn et al. |
| 2006/0036386 | A1 | 2/2006 | Cupples et al. |
| 2006/0088948 | A1 | 4/2006 | McManus et al. |
| 2006/0116853 | A1 | 6/2006 | Rappaport et al. |
| 2006/0157146 | A1 | 7/2006 | Hillam et al. |
| 2006/0192671 | A1 | 8/2006 | Isenmann et al. |
| 2006/0243345 | A1 | 11/2006 | Lease |
| 2007/0039662 | A1 | 2/2007 | Shuey |
| 2007/0174013 | A1 | 7/2007 | Liescheski |
| 2008/0064413 | A1 | 3/2008 | Breed |
| 2008/0071161 | A1 | 3/2008 | Jaeb et al. |
| 2008/0072432 | A1 | 3/2008 | Teys et al. |
| 2008/0156801 | A1 | 7/2008 | Tung et al. |
| 2008/0243648 | A1 | 10/2008 | Uzzo et al. |
| 2008/0270076 | A1 | 10/2008 | Breed |
| 2008/0282817 | A1 | 11/2008 | Breed |
| 2009/0015400 | A1 | 1/2009 | Breed |
| 2009/0045980 | A1 | 2/2009 | Leroy et al. |
| 2009/0228362 | A1 | 9/2009 | Lapsley et al. |
| 2010/0042340 | A1 | 2/2010 | Piszko |
| 2010/0141460 | A1 | 6/2010 | Tokhtuev et al. |
| 2010/0182136 | A1 | 7/2010 | Pryor |
| 2010/0188207 | A1 | 7/2010 | Glenn et al. |
| 2011/0120218 | A1 | 5/2011 | Aldridge |
| 2011/0134917 | A1 | 6/2011 | Glenn et al. |
| 2011/0181426 | A1 | 7/2011 | Bucciero |
| 2011/0232367 | A1 | 9/2011 | McManus et al. |
| 2011/0252883 | A1 | 10/2011 | Dietz et al. |
| 2012/0028680 | A1 | 2/2012 | Breed |
| 2012/0053863 | A1 | 3/2012 | Slade et al. |
| 2012/0206595 | A1 | 8/2012 | Alphenaar et al. |
| 2012/0226450 | A1 | 9/2012 | Olson et al. |
| 2012/0280809 | A1 | 11/2012 | Glenn et al. |
| 2012/0294173 | A1 | 11/2012 | Su et al. |
| 2013/0038455 | A1 | 2/2013 | Chowdhary et al. |
| 2013/0181829 | A1 | 7/2013 | Schnitz et al. |
| 2013/0185004 | A1 | 7/2013 | Faist |
| 2013/0317764 | A1 | 11/2013 | Kumar et al. |
| 2014/0130874 | A1 | 5/2014 | Burlage et al. |
| 2014/0200936 | A1 | 7/2014 | Alphenaar et al. |
| 2014/0292514 | A1 | 10/2014 | Glenn et al. |
| 2014/0347194 | A1 | 11/2014 | Schnitz et al. |
| 2014/0361887 | A1 | 12/2014 | Eskildsen et al. |
| 2015/0022376 | A1 | 1/2015 | Zhang et al. |
| 2015/0106723 | A1 | 4/2015 | Bertelsen |
| 2015/0120477 | A1 | 4/2015 | Stevenson et al. |
| 2015/0120515 | A1 | 4/2015 | Stevenson et al. |
| 2015/0192448 | A1 | 7/2015 | Glenn et al. |
| 2015/0233752 | A1 | 8/2015 | Slade et al. |
| 2015/0287313 | A1 | 10/2015 | Silvers |
| 2015/0298076 | A1 | 10/2015 | Fazekas et al. |
| 2015/0313387 | A1 | 11/2015 | Kwon et al. |
| 2015/0346014 | A1 | 12/2015 | Vander Putten et al. |
| 2015/0368086 | A1 | 12/2015 | Sacchetti |
| 2015/0369647 | A1 | 12/2015 | Kumar et al. |
| 2015/0379855 | A1 | 12/2015 | Glenn et al. |
| 2015/0379856 | A1 | 12/2015 | Glenn et al. |
| 2016/0003615 | A1 | 1/2016 | Biswas et al. |
| 2016/0027286 | A1 | 1/2016 | Glenn et al. |
| 2016/0033315 | A1 | 2/2016 | Glenn et al. |
| 2016/0041136 | A1 | 2/2016 | Dietz et al. |
| 2016/0116324 | A1 | 4/2016 | Job et al. |
| 2016/0134949 | A1 | 5/2016 | Kekäläinen |
| 2016/0163175 | A1 | 6/2016 | Jenkins |
| 2016/0171870 | A1 | 6/2016 | Chowdhary et al. |
| 2016/0253896 | A1 | 9/2016 | Chowdhary et al. |
| 2016/0255429 | A1 | 9/2016 | Dickson |
| 2016/0292796 | A1 | 10/2016 | Furlotte et al. |
| 2016/0311410 | A1 | 10/2016 | Donzis et al. |
| 2016/0334259 | A1 | 11/2016 | Chadowitz et al. |
| 2016/0343124 | A1 | 11/2016 | Sundheimer et al. |
| 2016/0348842 | A1 | 12/2016 | Crouse |
| 2016/0349097 | A1 | 12/2016 | Crouse |
| 2016/0358054 | A1 | 12/2016 | Armitage |
| 2017/0284854 | A1 | 10/2017 | Skowaisa |
| 2017/0299417 | A1 | 10/2017 | Otagaki et al. |
| 2018/0023962 | A1* | 1/2018 | Shi ..................... G01C 21/3407 701/466 |
| 2021/0341331 | A1* | 11/2021 | Williams ............. B67D 3/0029 |

FOREIGN PATENT DOCUMENTS

| | | |
|---|---|---|
| CA | 2269483 A1 | 10/2000 |
| CH | 706995 A2 | 3/2014 |
| CN | 203163826 U | 8/2013 |
| CN | 104318504 A | 1/2015 |
| CN | 104486428 A | 4/2015 |
| DE | 2410264 A1 | 9/1975 |
| DE | 3621427 A1 | 1/1987 |
| DE | 3639455 A1 | 5/1988 |
| DE | 4019436 A1 | 5/1991 |
| DE | 4336334 C1 | 11/1994 |
| DE | 4411478 A1 | 11/1994 |
| DE | 19537223 C1 | 2/1997 |

(56) References Cited

FOREIGN PATENT DOCUMENTS

| | | |
|---|---|---|
| DE | 19614785 A1 | 10/1997 |
| DE | 19903106 A1 | 8/1999 |
| DE | 20016437 U1 | 1/2001 |
| DE | 19950801 A1 | 4/2001 |
| DE | 19959133 A1 | 6/2001 |
| DE | 102005022558 A1 | 11/2006 |
| DE | 102005038607 A1 | 2/2007 |
| DE | 102005051153 A1 | 4/2007 |
| DE | 102005051580 A1 | 5/2007 |
| DE | 102006055898 A1 | 6/2007 |
| DE | 102006055900 A1 | 6/2007 |
| DE | 102006055897 A1 | 7/2007 |
| DE | 102006020342 A1 | 10/2007 |
| DE | 202008009679 U1 | 11/2008 |
| DE | 102007043328 A1 | 3/2009 |
| DE | 102010027962 A1 | 10/2011 |
| DE | 102010040865 A1 | 3/2012 |
| DE | 102011002038 B3 | 3/2012 |
| DE | 102010043935 A1 | 5/2012 |
| DE | 102011005836 B3 | 6/2012 |
| DE | 102011011364 A1 | 8/2012 |
| DE | 102012002413 A1 | 8/2012 |
| DE | 102011054462 A1 | 4/2013 |
| DE | 102011087119 A1 | 5/2013 |
| DE | 102011087230 A1 | 5/2013 |
| DE | 102011088351 A1 | 6/2013 |
| DE | 102012001911 A1 | 8/2013 |
| DE | 102012104478 B3 | 10/2013 |
| DE | 102012011165 A1 | 12/2013 |
| DE | 102012021794 B3 | 1/2014 |
| DE | 202013104569 U1 | 1/2014 |
| DE | 102013213040 A1 | 1/2015 |
| DE | 102013218971 A1 | 3/2015 |
| DE | 102015207766 A1 | 11/2015 |
| DE | 102015009079 A1 | 1/2016 |
| DE | 102014112019 A1 | 2/2016 |
| EP | 61334 A1 | 9/1982 |
| EP | 376646 A2 | 7/1990 |
| EP | 386965 A1 | 9/1990 |
| EP | 718607 A2 | 6/1996 |
| EP | 806636 A1 | 11/1997 |
| EP | 1045228 A1 | 10/2000 |
| EP | 1207373 A1 | 5/2002 |
| EP | 1347272 A2 | 9/2003 |
| EP | 1588900 A1 | 10/2005 |
| EP | 1925918 A2 | 5/2008 |
| EP | 1926068 A2 | 5/2008 |
| EP | 2180299 A1 | 4/2010 |
| EP | 2592003 A1 | 5/2013 |
| EP | 2641851 A1 | 9/2013 |
| EP | 2720006 A1 | 4/2014 |
| EP | 2884437 A1 | 6/2015 |
| EP | 2953247 A1 | 12/2015 |
| EP | 2985591 A1 | 2/2016 |
| EP | 2996351 A1 | 3/2016 |
| EP | 3029433 A1 | 6/2016 |
| FR | 2735862 A1 | 12/1996 |
| FR | 2828298 A1 | 2/2003 |
| FR | 2871740 A1 | 12/2005 |
| FR | 2871741 A1 | 12/2005 |
| FR | 2871742 A1 | 12/2005 |
| FR | 2871912 A1 | 12/2005 |
| FR | 2907250 A1 | 4/2008 |
| GB | 1415609 A | 11/1975 |
| GB | 1437443 A | 5/1976 |
| GB | 1540907 A | 2/1979 |
| GB | 2208316 A | 3/1989 |
| GB | 2210537 A | 6/1989 |
| GB | 2237112 A | 4/1991 |
| GB | 2271691 A | 4/1994 |
| GB | 2271855 A | 4/1994 |
| GB | 2294546 A | 5/1996 |
| GB | 2338789 A | 12/1999 |
| GB | 2409282 A | 6/2005 |
| GB | 2506577 A | 4/2014 |
| GB | 2527840 A | 1/2016 |
| KR | 20060099496 A | 9/2006 |
| KR | 20070087778 A | 8/2007 |
| KR | 100845972 B1 | 7/2008 |
| KR | 20090093031 A | 9/2009 |
| KR | 100932686 B1 | 12/2009 |
| KR | 100985209 B1 | 9/2010 |
| KR | 101001392 B1 | 12/2010 |
| KR | 20110046147 A | 5/2011 |
| KR | 20110136464 A | 12/2011 |
| KR | 200461904 Y1 | 8/2012 |
| KR | 101207374 B1 | 11/2012 |
| KR | 101294338 B1 | 8/2013 |
| KR | 101422997 B1 | 7/2014 |
| KR | 101451779 B1 | 10/2014 |
| KR | 20140120985 A | 10/2014 |
| KR | 101565583 B1 | 10/2015 |
| KR | 20150124106 A | 11/2015 |
| KR | 20160007150 A | 1/2016 |
| KR | 101596915 B1 | 2/2016 |
| KR | 20160014402 A | 2/2016 |
| KR | 20160051103 A | 5/2016 |
| KR | 101631188 B1 | 6/2016 |
| KR | 20160001962 U | 6/2016 |
| KR | 20160069666 A | 6/2016 |
| KR | 101640170 B1 | 7/2016 |
| KR | 20160112125 A | 9/2016 |
| KR | 101674866 B1 | 11/2016 |
| KR | 101683383 B1 | 12/2016 |
| KR | 101684350 B1 | 12/2016 |
| TW | M498355 U | 4/2015 |
| WO | 9629578 A1 | 9/1996 |
| WO | 9809227 A1 | 3/1998 |
| WO | 0026849 A1 | 5/2000 |
| WO | 0045247 A1 | 8/2000 |
| WO | 0045320 A1 | 8/2000 |
| WO | 0046710 A1 | 8/2000 |
| WO | 0046737 A1 | 8/2000 |
| WO | 0067187 A1 | 11/2000 |
| WO | 0074401 A1 | 12/2000 |
| WO | 0220287 A1 | 3/2002 |
| WO | 03052358 A1 | 6/2003 |
| WO | 03073139 A2 | 9/2003 |
| WO | 03073705 A1 | 9/2003 |
| WO | 03091672 A1 | 11/2003 |
| WO | 03101022 A2 | 12/2003 |
| WO | 2004013585 A1 | 2/2004 |
| WO | 2004048905 A1 | 6/2004 |
| WO | 2005015329 A1 | 2/2005 |
| WO | 2005096771 A2 | 10/2005 |
| WO | 2006008237 A1 | 1/2006 |
| WO | 2006053944 A1 | 5/2006 |
| WO | 2007011275 A1 | 1/2007 |
| WO | 2008036345 A1 | 3/2008 |
| WO | 2008042405 A2 | 4/2008 |
| WO | 2008146307 A2 | 12/2008 |
| WO | 2009046545 A1 | 4/2009 |
| WO | 2010019427 A2 | 2/2010 |
| WO | 2011058287 A1 | 5/2011 |
| WO | 2011077187 A1 | 6/2011 |
| WO | 2011127334 A2 | 10/2011 |
| WO | 2011133095 A1 | 10/2011 |
| WO | 2013013200 A1 | 1/2013 |
| WO | 2013017533 A1 | 2/2013 |
| WO | 2013183309 A1 | 12/2013 |
| WO | 2013183312 A1 | 12/2013 |
| WO | 2014071999 A1 | 5/2014 |
| WO | 2014089404 A1 | 6/2014 |
| WO | 2014136071 A1 | 9/2014 |
| WO | 2014186239 A1 | 11/2014 |
| WO | 2014188274 A2 | 11/2014 |
| WO | 2015017702 A2 | 2/2015 |
| WO | 2015061642 A2 | 4/2015 |
| WO | 2015153768 A1 | 10/2015 |
| WO | 2015175969 A1 | 11/2015 |
| WO | 2015187545 A1 | 12/2015 |
| WO | 2015190625 A1 | 12/2015 |
| WO | 2015194752 A1 | 12/2015 |
| WO | 2016037612 A1 | 3/2016 |

(56) References Cited

FOREIGN PATENT DOCUMENTS

| WO | 2016040857 A1 | 3/2016 |
| WO | 2016120866 A1 | 8/2016 |
| WO | 2016210388 A1 | 12/2016 |
| WO | 2017152185 A1 | 9/2017 |

OTHER PUBLICATIONS

International Patent Application No. PCT/US2019/046177, International Search Report and Written Opinion mailed Oct. 25, 2019, 13 pages.

"Ryobi Phone Works Stud Sensor," Ryobi, Retrieved online from https://web.archive.org/web/20170223140507/https://www.homedepot.com/p/RYOBI-PHONE-WORKS-Stud-Sensor-ES5500/205489747 on Oct. 3, 2019, dated Feb. 23, 2017, 3 pages.

"Ryobi Phone Works Laser Distance Measurer," Ryobi, Retrieved online from https://web.archive.org/web/20170609112321/http://www.homedepot.com:80/p/Ryobi-Phone-Works-Laser-Distance-Measurer-ES1000/205495687 on Oct. 3, 2019, dated Jun. 9, 2017, 2 pages.

\* cited by examiner

PORTABLE FLUID LEVEL MONITORING DEVICE AND METHOD

CROSS REFERENCE TO RELATED APPLICATION

This application claims the benefit of U.S. Provisional Patent Application No. 62/734,276, filed Sep. 21, 2018. The entire content of this application is incorporated herein by reference.

TECHNICAL FIELD

This disclosure relates generally to devices and methods for determining and monitoring a fluid level and, more particularly, to detecting a fluid level of a container and determining the amount of fluid remaining in the container.

BACKGROUND

Containers are used in a variety of applications to hold products in various forms and typically need to be refilled or replaced when their contents are expended. In order to reduce product waste and optimize inventory, it is necessary to determine a current fluid level in the container and estimate when the container may be empty. However, often times the container is not transparent and the attendant to the container cannot readily determine how much fluid is remaining in the container. The attendant is traditionally left to manually estimate how much fluid is remaining in the container, for instance, by shaking the container or knocking on the container to determine the fluid level. Even more, the attendant is traditionally left to manually determine the geometry of the container, e.g., the cross sectional area, to determine the volume of the fluid remaining in the container. Sometimes, the attendant can get these measures and calculations wrong, which can affect operations, supply, and quality.

SUMMARY

Embodiments disclosed herein can be useful in determining a fluid level in a container and the amount of fluid remaining in the container. As indicated above, traditional methods of determining this information have disadvantages which can result in significant error. Even more, more accurate traditional methods for achieving these results may be costly or impracticable. For instance, smaller product containers that are empty may be traditionally replaced with a new full container instead of refilled due to how frequently they are expended in relation to larger product containers. Thus, unlike with larger, more permanent product containers, installing a dedicated sensor to detect a fluid level on smaller product containers that is frequently replaced can become costly and impractical. More costly and cumbersome devices and methods exist that can weigh the container or monitor the flow from the output of the container. Such measures, however, can be cumbersome to operate and use; costly to install or train to operate and maintain; and impracticable, especially for smaller portable containers. The present disclosure achieves the object of determining the fluid level in a container and the amount of fluid in the container without these disadvantages.

Some embodiments in the present disclosure comprise a portable liquid product measuring device including a housing, a sensor, and a measurement system. In some embodiments, the housing can be attachable to the container, for instance, at a reference point of the container. The sensor, such as a capacitance or ultrasonic sensor in many embodiments, can be supported by the housing and can be used for detecting a fluid level of a container. The measurement system can receive information from the measuring device and may determine an amount of fluid in the container based on a measurement of the container and a detected fluid level of the container and may output the amount of fluid in the container and geometric information of the container. In certain embodiments, the measurement system can include a graduated measuring instrument, a measuring wheel, and/or a non-contact distance sensor to determine the distance from the device to a reference point of the container for example. Methods of using the measuring device can include a method for determining an amount of fluid in a container having a fluid level and a method for monitoring an amount of fluid in a container having a fluid level. Some embodiments of the disclosure can be configured to do any of reading, storing, and displaying information and/or signaling a user that a fluid level was detected.

Such devices and methods can offer several advantages over traditional methods of determining a fluid level of a container or the amount of fluid remaining in a container. Information from such devices and methods can be used, for example, in optimizing inventory tracking, order scheduling, consumption analysis, and cross-checking or calibrating additional sensors that are already installed on the container for that purpose. An attendant to the containers can know when a container is empty or nearing empty to prevent unintended or untimely stoppages or delays in operations and reduce waste of product if the container was not in fact empty. Subjectivity and error in measurements and calculations can be minimized since a more accurate measure of distances, the fluid level, and even of the container itself can be achieved with these devices and methods.

The details of one or more examples are set forth in the accompanying drawings and the description below. Other features, objects, and advantages will be apparent from the description and drawings, and from the claims.

DETAILED DESCRIPTION

The following detailed description is exemplary in nature and is not intended to limit the scope, applicability, or configuration of the invention in any way. Rather, the following description provides some practical illustrations for implementing various embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Figure 1A:
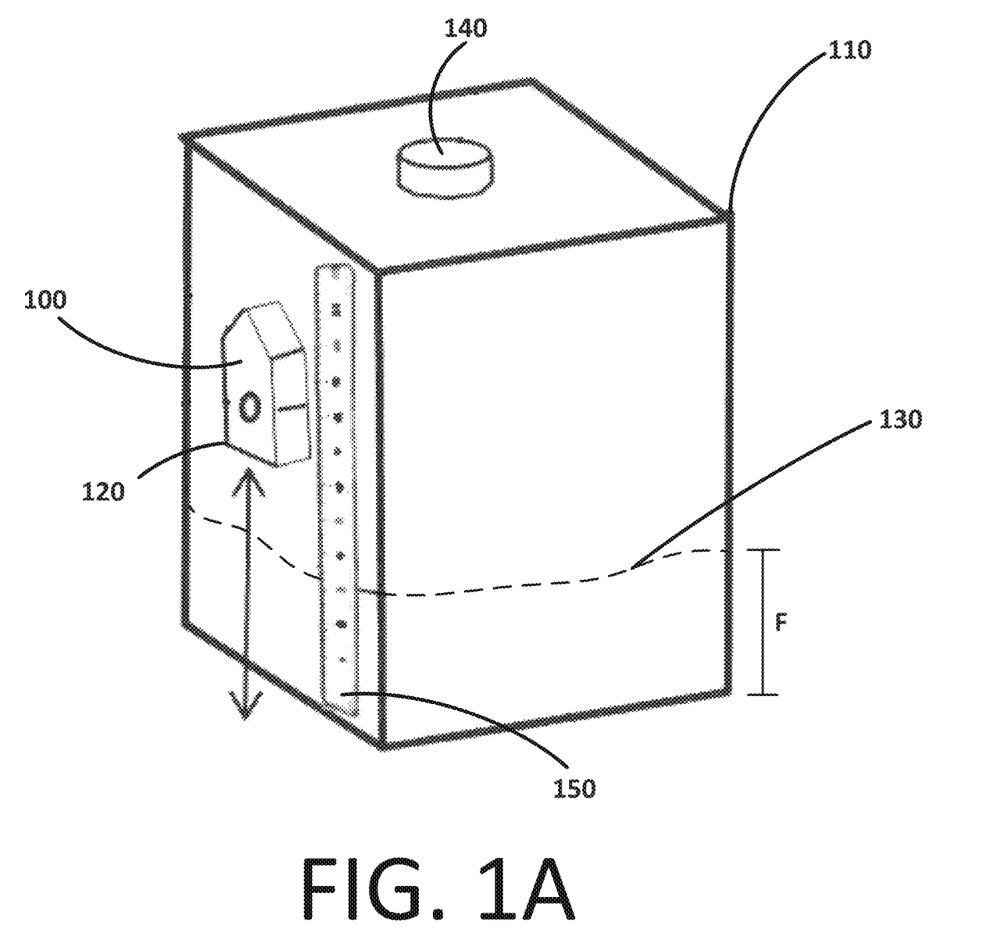
FIG. 1A is a perspective view of a container and an illustrative measuring device placed proximal to or abutting the container.

FIG. 1A shows a portable liquid product measuring device 100 in use on a container 110. The portable liquid product measuring device 100 can include a housing 120, a sensor, and a measurement system. Different embodiments of the device 100 can be of varying shapes and sizes. Components of the device 100 can be in fluid communication with each other or other components of the container 110, whether it is, for example, through wired (e.g., fiber optic cables) or wireless (e.g., BLUETOOTH) connections.

The container 110 may hold a product 130, for example, in solid or liquid form and have a port hole 140 for extracting the product 130. The product 130, whether liquid or solid, can have a fluid level, F, in the container 110 at the height where the product 130 reaches within the container 110. The height above the fluid level typically corresponds to the empty or air-filled portion of the container 110, though it could alternatively be a second product 130. In any instance, the fluid level can be the fill level of the container 110. The container 110 in some instances may be a small product container such as a pail or drum. In other situations, the container 110 may be a bulk tank (e.g., a PORTA-FEED tank).

In any of these instances, the device 100 can be used to detect the fluid level of one or more containers, for instance, in occasions where the fluid level of the container 110 may be otherwise difficult to readily determine due to the construction of the container 110. For example, in some situations the container 110 may be sufficiently opaque such that a fluid level is not easily perceptible. In this and other situations, the container 110 may be outfitted with an integral or separate sight gauge or a tank level monitoring system (TLM). The measuring device 100 can determine a fluid level in at least these types of containers. For example, the device 100 can determine the fluid level of the container 110 using the fluid level indicated by the sight gauge in a similar manner to using the detected fluid level of the container 110 itself. One skilled in the art can appreciate that other types of containers and applications of the measuring device 100 are apparent.

The measuring device 100 can provide a non-intrusive detection of a fluid level and a measurement of the amount of fluid remaining in a container 110. The measuring device 100 may be placed proximal to or in abutment with an outer surface of the container 110. Features of the device 100 may facilitate safe and controlled abutment or placement of the device 100. As indicated by the arrows in FIG. 1A, the device 100 can be moved in a direction along the outside of the container 110. The device 100 can detect the level of fluid, solid, or the like within the container 110. For example, as the device 100 moves as described herein, it can move between a portion of the container 110 having a first product 130 and a portion of the container 110 having a second and/or third product and so on. As described elsewhere, for example, the measuring device 100 may determine the intersection of the different products (e.g., the intersection of the first and second products). In many embodiments, the measuring device 100 may do any of determining the distance between itself and a reference point of the container 110, alerting the user, calculating the amount of that particular fluid remaining in the container 110, storing information, or displaying information whether it be at an intersection point or otherwise.

Figure 1B:
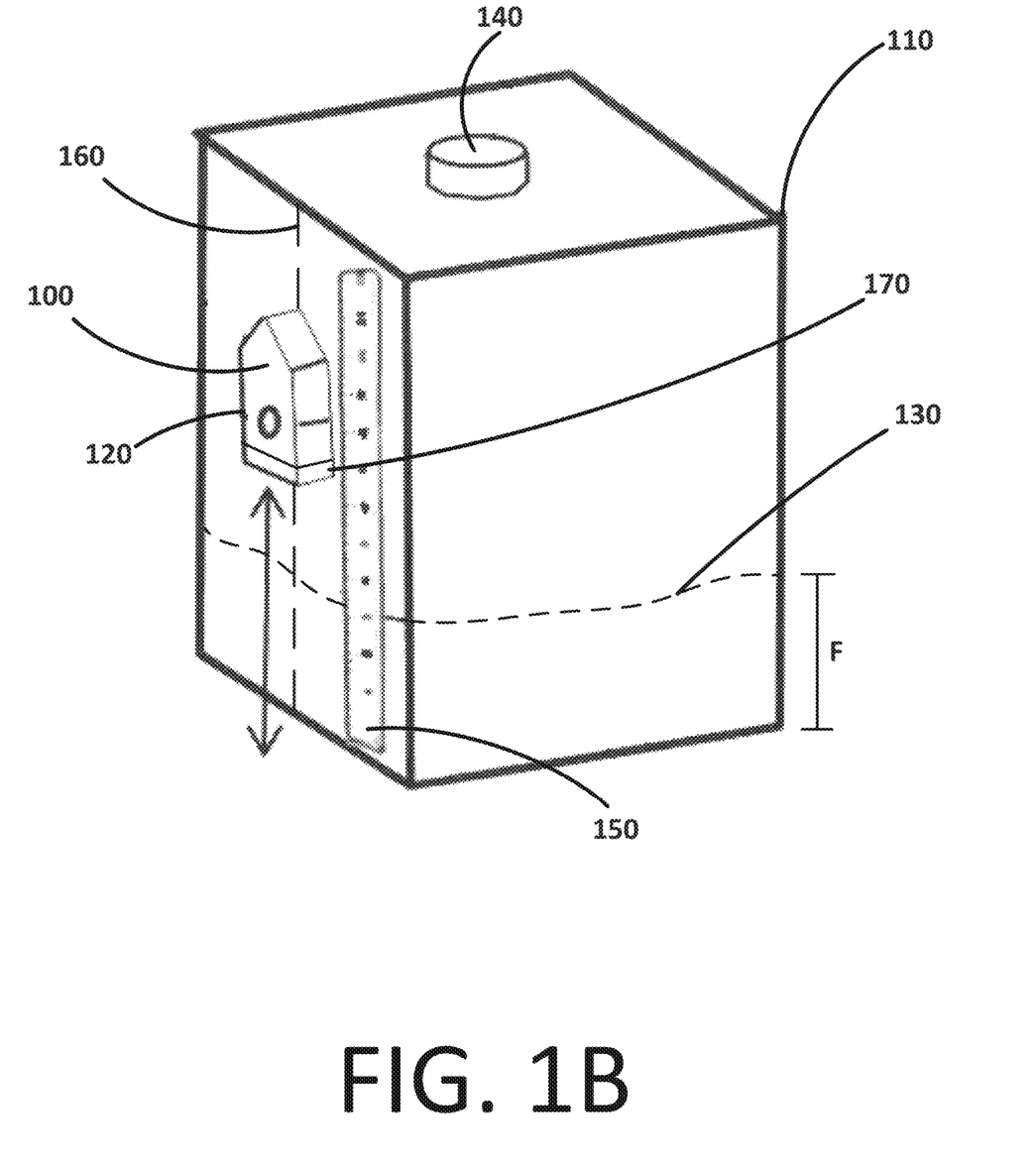
FIG. 1B is a perspective view of a container and an illustrative measuring device placed proximal to or abutting the container with a track and a motion system.

In many embodiments, the housing 120 of the measuring device 100 can be attachable or positioned at a reference point to the container 110, for example, at different points on the container 110 as shown in FIG. 1B. The device 100 itself or the housing 120 in some embodiments can be sized to fit within the hand of a user (see, e.g., FIG. 7). Certain instances of the device 100 can have the housing 120 slidably connected to the outside of the container 110, for example, on a track 160 that places the measuring device 100 proximal to or in abutment with the container 110 where the device 100 can be controllably moved (e.g., manually, remotely, automatically via automation, etc.) along the track 160 via a motion system 170 (e.g., a motor, lift, etc.). Other instances of the housing 120 can modularly connect to the outside of the container 110. For example, the housing 120 may connect to the container 110 using one or more interlocking pieces, mechanical fasteners, magnets, or other similar mechanisms of attachment. In some instances, the housing 120 can be attached to a reference point of the container 110, which may be any point on the container 110. For example, the reference point may indicate the fill level of the container 110 (e.g., 0, ¼, ½, ¾, etc.) or critical fill levels of the container 110 (e.g., a level of fluid in the container 110 which indicates a replacement container needs to be ordered, filled, or changed).

Figure 2:
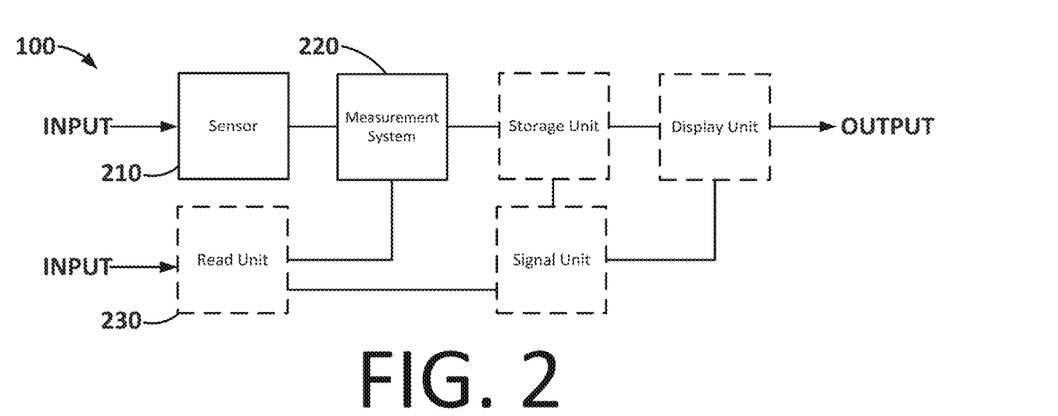
FIG. 2 is a schematic diagram of an illustrative measuring device.

The sensor 210 shown in FIG. 2 can detect one or more fluid levels of a container though the types of sensor 210 and location of the sensor 210 may vary between embodiments. In any of these instances, for example, the one or more fluid levels may be either or both of multiple levels of a fluid or multiple fluids levels from fluids layered within the container and may detected at any time (e.g., continuously, sporadically, periodically, etc.). The type of sensor 210 can be any type that can sense a change in product, e.g., due to a change in capacitance or ultrasonic waves of liquid and air. For example, the sensor 210 can be selected from the group consisting of a capacitance sensor and an ultrasonic sensor.

The sensor 210 can be supported by the housing. The sensor 210 in many embodiments can be internally arranged at a location of the housing or external to the housing such that it facilitates proper reading of a fluid level in either configuration in either case. In some embodiments, the device 100 can have multiple of the same or different types of sensors. Though depicted as being aligned (see 210 FIG. 5B), one skilled in the art can appreciate that sensors in devices having multiple sensors can be arranged in numerous ways.

The measurement system 220 can be configured to receive information and perform multiple functions and calculations. In many embodiments, the measurement system 220 can be configured to receive information indicative of a geometric measurement of the container. Some embodiments of the measuring system 220 can be configured to determine a volume amount of fluid in the container. Determining the volume amount of fluid in the container can be based on either or both of the geometric measurement of the container and the one or more detected fluid levels of the container. In some embodiments, the measurement system 220 can output the volume of fluid in the container.

Such information may be entered into the device 100, for example, via components of the device 100 itself or an external input such as a wired (e.g., USB, Ethernet, RS-232, etc.) connection or a wireless (e.g., BLUETOOTH, cellular, Wi-Fi, etc.) connection. Examples of such information can include output from any of the components of the measuring device 100 and at least one measurement of the container. In some embodiments, the measuring device 100 can include a read unit 230 that can read a marker (e.g., a barcode or QR code) and that can provide information to the measurement system 220. In some embodiments, the sensor 210 and read unit 230 can comprise the same unit. The marker, for instance, can be provided on the container. In some embodiments the marker can include geometric information of the container, such as the overall volume of the container or the cross-sectional area of the container, which can be inputted into and used by the measurement system 220.

The measurement system 220 can use information to calculate and transmit information pertaining to the container and the fluid in the container to other components of the device 100 itself or other external devices. The measurement system 220 need not be integral to the device 100 to operate as described herein. That is, calculations may be performed by the measuring device 100, for instance, by an external device (e.g., a cellular phone or computer), by cloud computing, or by the device 100 itself. Some embodiments of the measurement system 220 can include a controller or processor. Such components can include, but are not limited to, application specific integrated circuits (ASICs), microcontrollers, microprocessors, field-programmable gate arrays (FPGAs), or any other appropriate structure capable of receiving and processing data. Additionally or alternatively, one or more processors can be distributed across a network and be configured to receive and process volumetric data and control system operation as described herein from a remote location. For instance, in some examples, the processor can include cloud-based computing capabilities.

Figure 3:
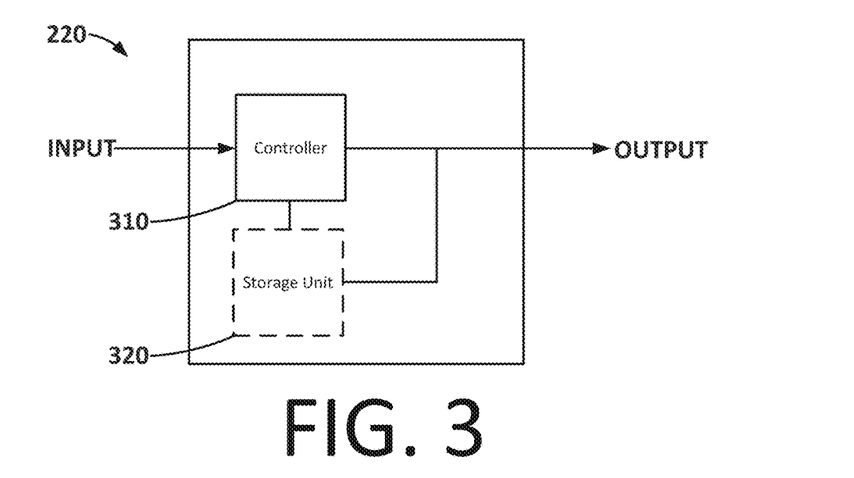
FIG. 3 is a schematic diagram of a measurement system in an illustrative measuring device.
Figure 4:
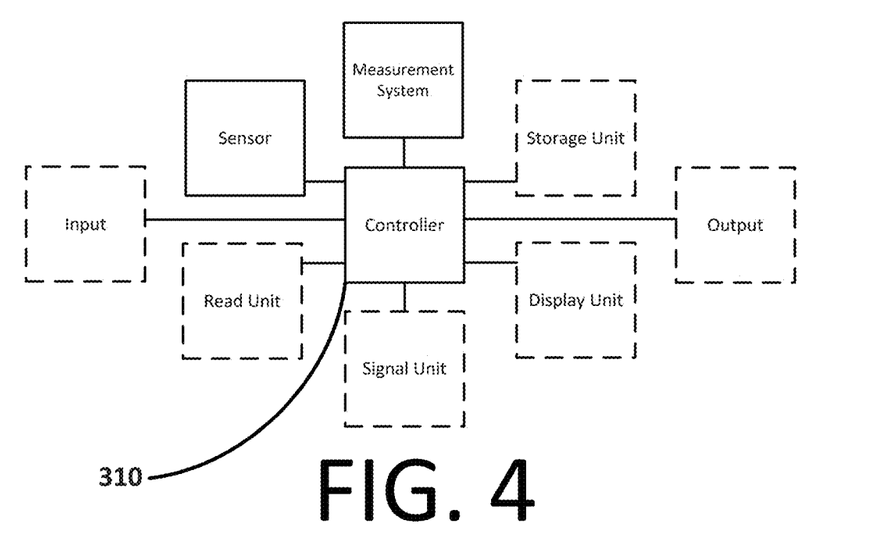
FIG. 4 is a schematic diagram of an illustrative measuring device.

The measurement system 220 can determine an amount of fluid in the container as shown, for example, in FIG. 3. In some instances, the measurement system 220 can include any or all of a controller 310 as described above, e.g., for storing information calculating necessary parameters required by the measurement system 220 (e.g., the volume of the fluid), and a storage unit 320. In some instances, the controller 310 may perform any of the calculations and processes such as those disclosed elsewhere herein. It should be noted that a controller 310 of the device 100 need not be integral to the measurement system 220 as illustrated in FIG. 4 (see reference to controller 310). In any instance, the controller 310 can facilitate, for example, the receipt and distribution of information for components of the device. One skilled in the art can appreciate that other measurements, fluid qualities, and the like desired by and useful to an attendant to the container can also be determined using an embodiment of the measuring device 100.

Figure 5A:
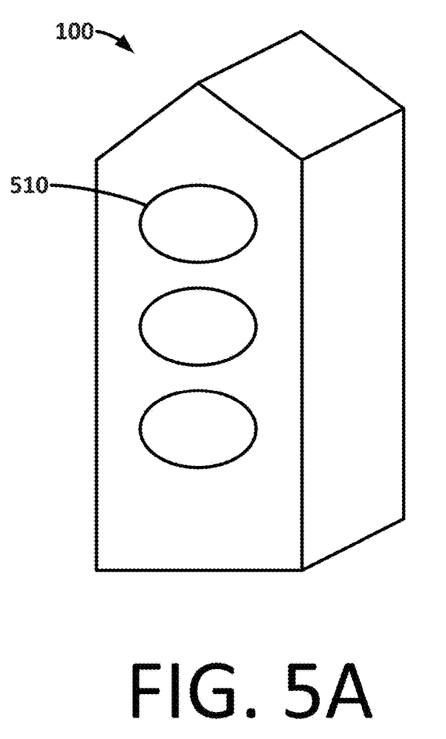
FIG. 5A is a perspective view of an illustrative measuring device having multiple signals and sensors.
Figure 5B:
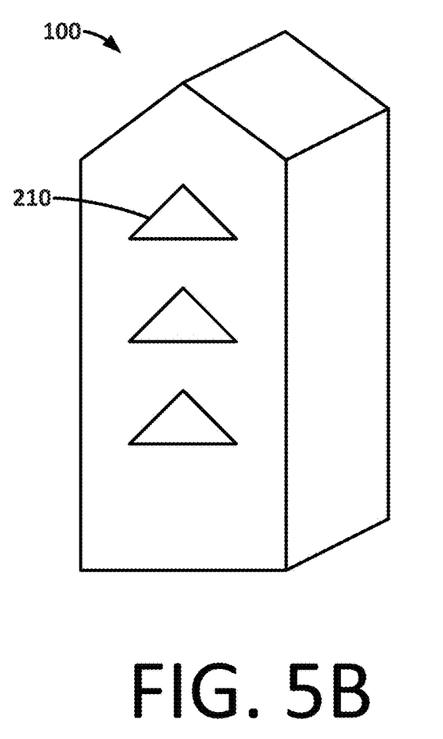
FIG. 5B is a perspective view of an illustrative measuring device having multiple signals and sensors.

In some instances, the device 100 can include a signal unit 510 as shown in FIG. 5A. In some embodiments, there may be one or more signal units at certain locations on the device 100. The location of the signal unit 510 can coincide with the location of the sensor 210 as shown in FIG. 5B. The signal unit 510, for example, can indicate a detection of a fluid level of the container. The indication can be, for instance, in audible (e.g., a particular sound) or visual form (e.g., an LED light). In certain instances, any of the signal units can indicate, for example, the status of components of the device 100 (e.g., an error or power on state), the proximity of a fluid level to the position of the device 100, or a successful measurement and/or calculations as described below.

Measurements of the fluid level in the container can be based on or include either or both of a measurement of the container and the detected fluid level of the container. For example, a calculation of the volume of fluid in a container can be given by:

$$\text{Volume} = \text{container area} \times \text{measured fluid height} - \text{correction factor}$$

where, for instance, the container area can be the cross sectional area of the container, the measured fluid height can be the vertical distance of the fluid level from a reference point of the container (e.g., the bottom of the container), and the correction factor can be a number that accounts for curved surfaces, corrugations, and/or ribs on or near the container bottom or the sight of measurement. The measured fluid height (or any other measurement of the container) can be determined in multiples ways, examples of which are described below. In some instances, measurements may be taken and calculations performed simultaneously with movement of the device 100 or on a delay, for instance, until a fluid level is detected. If the device 100 receives an overall volume of the container, and the container is symmetrical about a vertical axis, the device 100 could also calculate the volume as a function of the fluid level as compared the container height (e.g., [height/overall height]*[container volume]). The overall container height would either need to be measured, similar to the fluid level measurement or received, similar to the container volume.

In an example for determining, for instance, the measured fluid height, the measurement system in some embodiments includes a graduated measuring instrument 150 as shown in FIGS. 1A and 1B. The graduated measuring instrument 150 can assist in determining a distance, preferably, between the sensor and a reference point of the container 110. In any instance, the measuring device can determine one or more distances, e.g., via the measurement system. The device 100 can be moved, for example, along the vertical distance of the container 110 as indicated by the double arrows in the figure. Certain embodiments of the of the measuring device 100 can have, for example, a graduated measuring instrument 150 external to the measuring device 100 (e.g., a ruler on the container 110) or one that is internal to the measuring device 100 (e.g., measuring tape connectible to a reference location on the container 110). The graduated measuring instrument 150 can be placed near the measuring device 100 and/or concealed, for example, when not in use by the user or when not being referenced by the device 100. One or more markings, for instance, by a user or the device 100 itself on any of the graduated measuring instrument 150, container 110, or some other reference can indicate a fluid level, measurement, and/or reference locations of the container 110.

Figure 6:
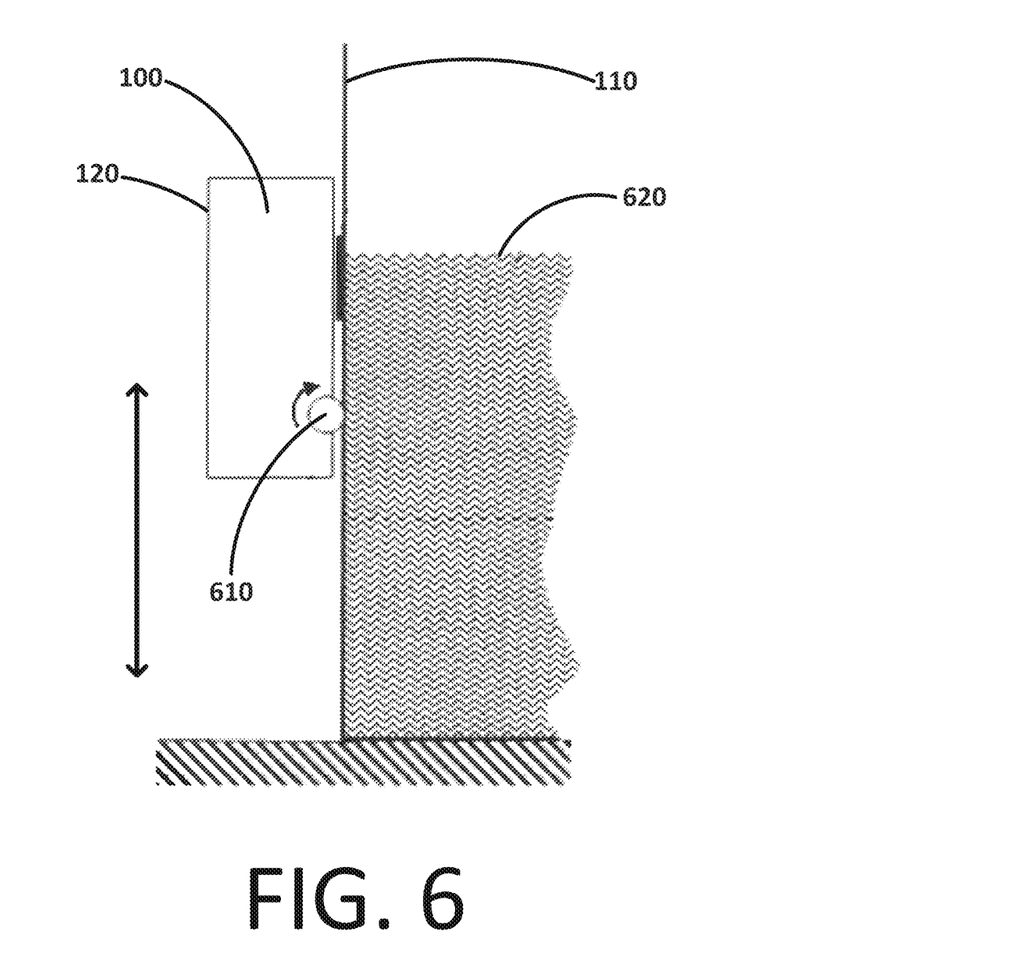
FIG. 6 is a side, cutaway view of a container having a fluid level, a reference point of the container, and an illustrative measuring device placed proximal to or abutting the container having a measuring wheel.

In another example for determining, for instance, the measured fluid height, the measurement system in certain instances can include a measuring wheel 610 as shown in FIG. 6. The device 100 can be moved, for example, along the vertical distance of the container 110 as indicated by the double arrows in the figure. The measuring wheel 610 can be configured determine a distance traveled. The distance traveled can be, for example, from a reference point of the container 110 to a position of the sensor. In some instances, the measuring wheel 610 is rotatably connected to the housing 120. In other embodiments, the measuring wheel 610 may be rotatably connected to an external device 100 and be in communication with the measuring device 100 via wired or wireless connections. Such an external device 100 comprising a measuring wheel 610 can be attachable to the housing 120. In operation, for instance, a user can begin with the measuring wheel 610 on the reference point and move the device 100 until a fluid level 620 is detected. Once the fluid level 620 is detected, the device 100 can determine the distance traveled by the wheel, and thus, the distance from that reference point to the point where a fluid level 620 was detected, e.g., the measured fluid height.

Figure 7:
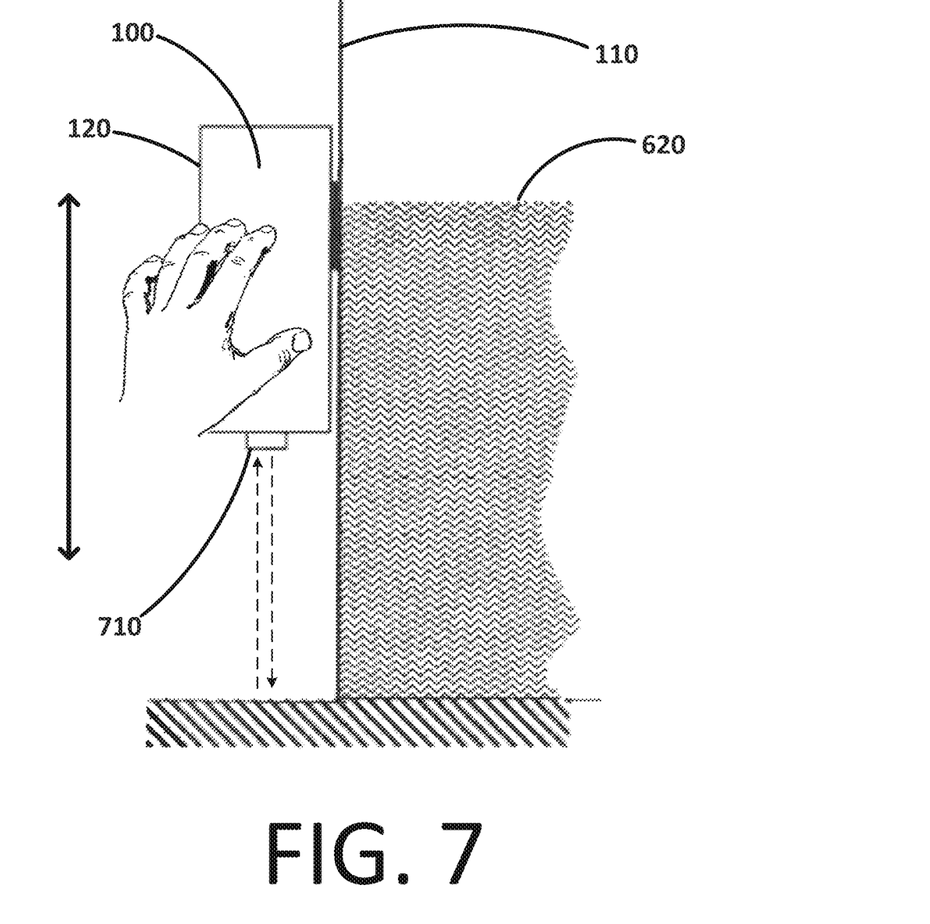
FIG. 7 is a side, cutaway view of a container having a fluid level, a reference point of the container, and an illustrative measuring device in the hand of a user and placed proximal to or abutting the container having a non-contact distance sensor.

In yet another example for determining, for instance, the measured fluid height, some embodiments of the measurement system can include a non-contact distance sensor 710 as shown in FIG. 7. The device 100 can be moved, for example, along the vertical distance of the container 110 as indicated by the double arrows in the figure. Examples of a non-contact distance sensor 710 can include measurement technologies such as ultrasonic, lidar, or laser triangulation. Other examples of the non-contact distance sensor can include LIDAR, Capacitance, RADAR, Vision or Camera based sensing technologies. The non-contact distance sensor 710 can be configured to determine a distance between the sensor and a reference point of the container 110. For instance, a reference point of the container 110 can be coincident with a stationary surface supporting the container 110 at its bottom. In such cases, the non-contact distance sensor 710 can beam a signal (indicated by the hashed arrows in FIG. 7) to the reference point and receive the signal as it is directed back towards the device 100. In some instances, the non-contact distance sensor 710 is connected to the housing 120. Other features of the container 110, such as extrudes from the outer surface or corrugations, can facilitate beaming and reflecting the non-contact distance sensor 710 for performing its calculations at different reference points on the container 110.

Output from the device 100 can be supplied to other devices or components of the measuring device 100. The measurement system 220 can output the amount of fluid in the container in certain embodiments. Referring back to FIGS. 2-4, the output of the measurement system 220 can be transmitted and received by different components of the device 100 or external components as described elsewhere herein. In certain embodiments, the measurement system 220 can, for instance, output geometric information of the container. In some embodiments, the measurement system 220 can output the amount of fluid remaining in a container. Such information can be usable for any of determining, optimizing, and tracking inventory, product consumption and/or scheduling, and purchasing product or generating alerts (e.g., audible, visible, or physical), notifications, analytics, insights and other outputs or interpretations of the device. This information can be, e.g., stored or displayed as described elsewhere herein.

In many embodiments, the measuring device 100 can include a storage unit 320 as shown in FIGS. 2-4. In some embodiments, the storage unit 320 can be configured to receive the output from the measurement system 220, store the output from the measurement system 220, or both. The storage unit 320, for example, may be one or more of a computer and/or hard drive, network server, or database that are either partially or completely internal or external to the measuring device 100. In some embodiments, storing information may be performed manually or by the device 100 itself. In many embodiments, information received by the storage unit 320 may be held in temporary memory (e.g., RAM) and/or permanent memory (e.g., ROM). The storage unit 320 in some instances can be configured to store time, date, location, fluid composition, and calibration data from the device 100. The information stored on the storage unit 320 can be, for example, any of the information, programs, data, calculations, metrics, or other data described elsewhere herein. One skilled in the art can appreciate that other information (e.g., firmware, third-party apps or calculations routines, etc.) or types of information can be advantageously stored in the storage unit 320 as well.

As shown in FIGS. 2 and 4, some embodiments of the measuring device 100 can include a display unit. The display unit can be configured to display information from the measuring device 100, e.g., either or both of the measurement system 220 and the storage unit. The display unit may, for instance, be incorporated into the measuring device 100 itself or be external to the device 100, receiving information via wireless or wired mediums in any case. Certain embodiments may have a display unit that is, for example, a cellular phone; a monitor; virtual reality, holographic, or projected images; or the like. In some instances, the device 100 may be incorporated into a cellular phone, for instance, with one or more dedicated applications to perform operations as described elsewhere herein using the cellular phone's communication protocols and otherwise operating as described elsewhere herein.

With the display unit, a user may be able to select what and how information from the measuring is displayed on the display unit (e.g., fluid qualities and/or adjustable windows of information). The display unit can be configured to receive output and/or information from the measuring device 100 and carry out processes and calculations such as those herein described. A preferable display unit can include one or more processors, a display, and a user interface for carrying out such processes. A user may manually enter any information relating to the container or fluid level using the user interface. A display unit can be incorporated into any appropriate device or system capable of receiving and processing output and/or information from the measuring device 100.

The measuring device 100 in certain embodiments may be used to calibrate and support automated monitoring systems. For example, an ultrasonic or differential pressure level sensor system or TLM can be calibrated or recalibrated by placing the measuring device 100 at reference locations on the container 110. The measuring device 100 may serve as a redundant, backup sensor, for instance, in case the automated monitoring system or TLM fails. Calibration and support information can be treated similarly to other information of the measuring device 100 (e.g., used, stored, and displayed) as described elsewhere herein.

Methods of using a measuring device 100 as described herein are also disclosed. It is understood that additional steps can be provided before, during, and after the steps of the method and some of the steps described can be replaced, eliminated, or modified in other embodiments. For example, steps shown with dashed outlined in FIGS. 8 and 9 may be eliminated in certain embodiments. Similarly, in some instances, steps in a diamond-shaped outline may be repeated until a "YES" condition is reached, or not for instance. Any device, components, information, or the like used in the embodiments of the methods described below can be used and treated similarly as described elsewhere herein.

Figure 8:
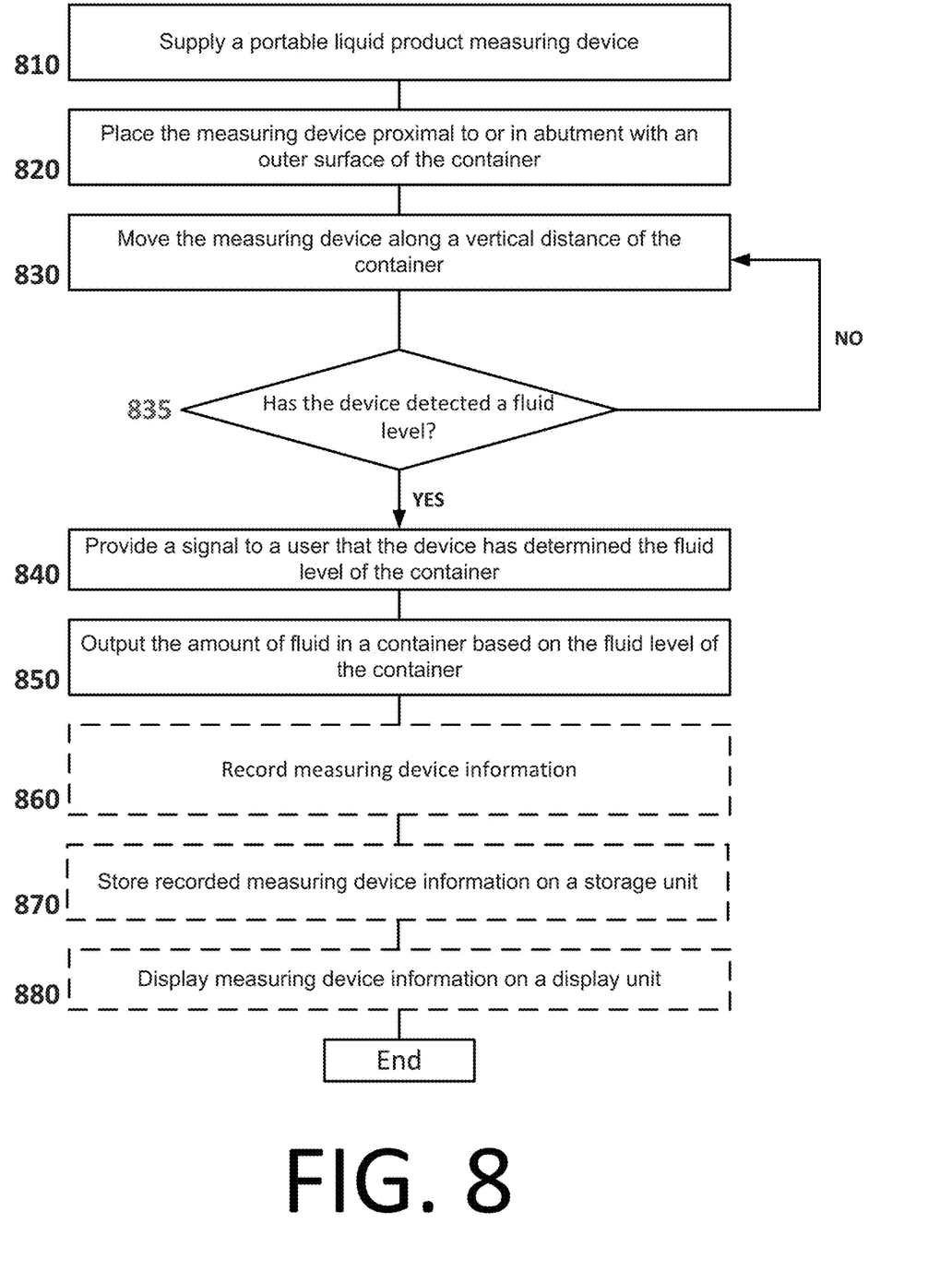
FIG. 8 is a flowchart illustrating a method of determining a fluid level in a container.

A method for determining an amount of fluid in a container 110 having a fluid level is shown in FIG. 8. The method can include supplying a portable liquid product measuring device 810 similar to those described elsewhere herein. The method can include placing the measuring device proximal to or in abutment with an outer surface of the container 820. The method can include moving the measuring device along a vertical distance of the container 830. At step 835, for example, the device itself and/or user can determine whether the device has detected a fluid level and continue to move the measuring device if it was not detected a fluid level or continue if the fluid level was detected. The method can include providing a signal to a user that the device has determined the fluid level of the container 840. The signal can be provided by a signal unit of the measuring device as described elsewhere herein. The method can include outputting the amount of fluid in a container based on the fluid level of the container 850.

In some embodiments, the method can include recording measuring device information 860. In some embodiments, recording information may be performed manually or by the device itself. The measuring device information can at least include when the device has determined the fluid level of the container. In some embodiments, the measuring device information can include the output from the measurement system. Measuring device information can, for instance, be used in protocols and/or storage operations for the measuring device. In some embodiments, the method can include recording the output from the measuring device.

Certain embodiments of the method can include storing and displaying information. The method in certain embodiments can include storing measuring device information in a storage unit 870. The storage unit can be similar to those described elsewhere herein. Likewise the information stored can include any of the information, programs, data, calculations, metrics, or other data described elsewhere herein. Some embodiments of the method can include displaying measuring device information on a display unit 880. In some instances, the display unit can be configured to calculate and display certain metrics and information of the fluid in the container. In some embodiments, the method can include displaying the measuring device information. The display unit can be similar to those described elsewhere herein.

Certain embodiments of the method can have the device move between different positions at certain steps. In some instances moving the measuring device along the vertical distance of the container includes moving the device between a position above a fluid level of the container and a position below a fluid level of the container. Such movement can, for example, facilitate, confirm, and calibrate detections of a fluid level. In some embodiments where moving the measuring device between positions is repeated, the distance traveled between each repetition may decrease as the number of repetitions increase.

Figure 9:
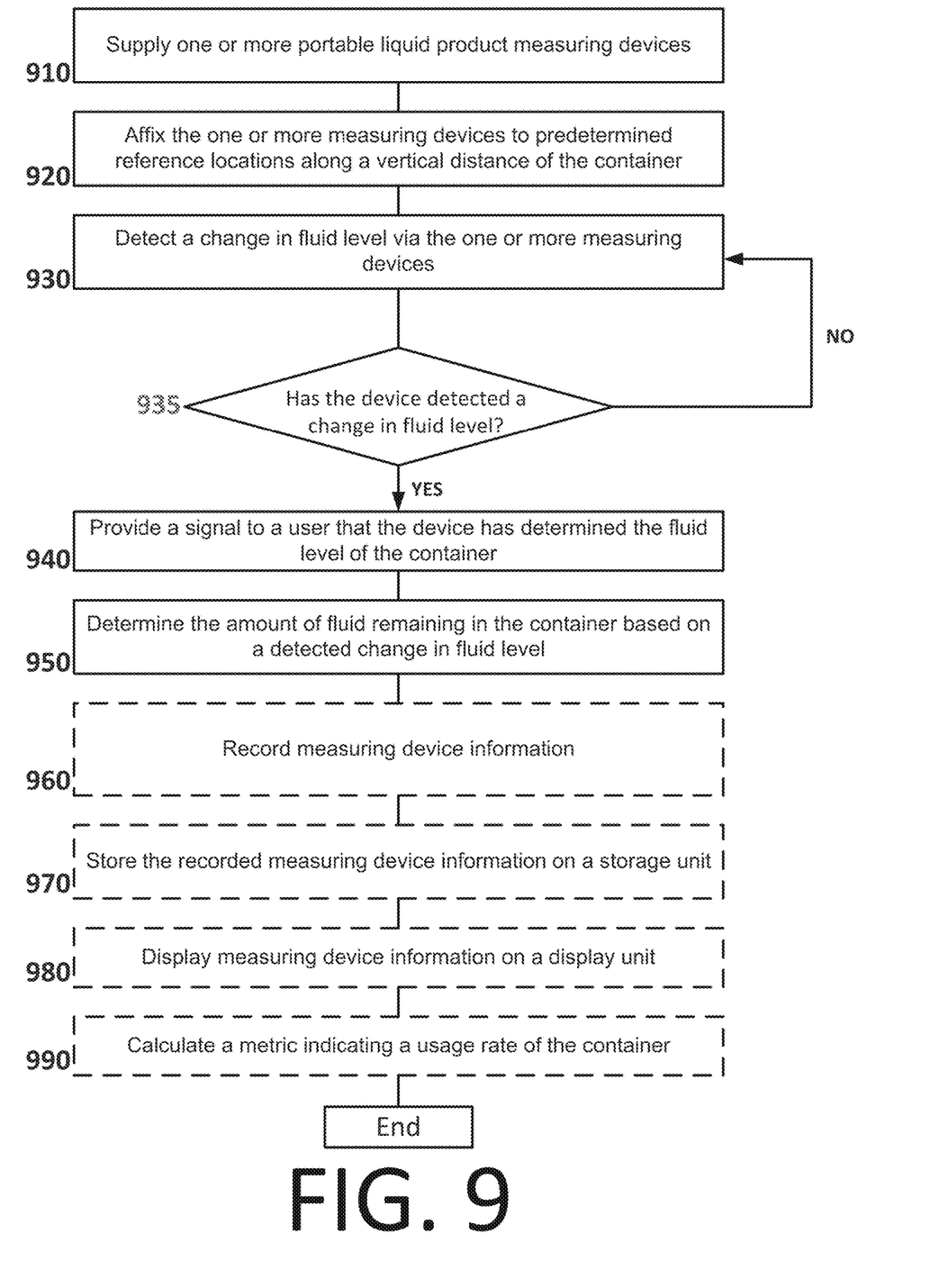
FIG. 9 is a flowchart illustrating a method of determining and monitoring a fluid level in a container.

A method of monitoring an amount of fluid in a container having a fluid level is shown in FIG. 9. The method can include supplying one or more portable liquid product measuring devices 910 similar to those described elsewhere herein. The method can include affixing the one or more measuring devices to predetermined reference locations along a vertical distance of the container 920. The method can include detecting a change in fluid level via the one or more measuring devices 930. At step 935, for example, the device itself and/or user can determine whether the device has detected a fluid level and continue to move the measuring device if it was not detected a fluid level or continue if the fluid level was detected. The method can include providing a signal to a user that the device has determined the fluid level of the container 940. The signal can be provided by a signal unit of the measuring device as described elsewhere herein. The method can include determining the amount of fluid remaining in the container based on a detected change in fluid level 950.

In some embodiments, the method can include recording measuring device information 960. In some embodiments, recording information may be performed manually or by the device itself. Measuring device information can, for instance, be used in protocols and/or storage operations for the measuring device. In some embodiments, recording information may be performed manually or by the device itself. The measuring device information can include which of the one or more measuring devices has determined a fluid level of the container and/or geometric information of the container. The method can include recording the output from the measuring device.

Certain embodiments of the method can include storing information and alerting a user. The method in certain embodiments can include storing measuring device information in a storage unit 970. The storage unit can be similar to those described elsewhere herein. In some embodiments, the recording and storing can be performed by the same unit. The method can include providing a signal to a user that the device has determined the fluid level of the container 980. The signal can be provided by a signal unit of the measuring device as described elsewhere herein.

The method in some embodiments can be configured to indicate certain levels or conditions of the container. Some instances of the method can include affixing a measuring device to a reference point of the container. The reference point of the container can indicate when a container should be replaced. In many embodiments, providing the signal comprises signaling when the measuring device has determined the fluid level of the container. In some embodiments, providing the signal comprises signaling when the measuring device has determined the fluid level of the container. Some methods may include the one or more measuring devices being in fluid communication with one another, for instance, to approximate fluid levels between reference points and/or trigger a power on or power off state to a device.

In some instances, the method can be configured to calculate and display certain metrics and information of the fluid in the container. Some embodiments of the method include calculating a metric indicating a usage rate of the container 990. Such metrics, for instance, can be a rate of consumption, a reaction rate, average quantity of an item being purchases or expended, and the like. In some embodiments, the method can include displaying the measuring device information. The display unit can be similar to those described elsewhere herein.

Various embodiments have been described. Such examples are non-limiting, and do not define or limit the scope of the invention in any way. Rather, these and other examples are within the scope of the following exemplary embodiments.

What is claimed is:

1. A non-intrusive portable liquid product measuring device comprising:
   a housing slidably connected to a container;
   a read unit configured to read a marker code on the container, the marker code comprising information indicative of a cross-sectional area of the container;
   a capacitive sensor supported by the housing and configured to detect one or more fluid levels of the container through the outer surface of the container;

a measurement system comprising a measuring wheel configured to contact the container, the measurement system configured to:
receive the cross-sectional area of the container from the read unit,
determine one or more distances including a distance traveled by the measuring wheel starting from a reference point on the container and ending at a position above the reference point where the capacitive sensor detects a fluid level of the one or more fluid levels, wherein the reference point is representative of a height at which the container should be refilled or replaced;
determine a volume amount of fluid in the container based on the cross-sectional area of the container, the distance traveled by the measuring wheel from the reference point to the position of the sensor, and the one or more detected fluid levels of the container, and
output the volume amount of fluid in the container; and
a motorized motion system configured to move the sensor vertically along a track on the container such that the capacitive sensor can detect one or more fluid levels of the container, the capacitive sensor being placed proximal to or in abutment with an outer surface of the container.

2. The device of claim 1 further comprising a signal unit for indicating a detection of a fluid level of the container.

3. The device of claim 1 wherein the measurement system comprises a graduated measuring instrument for determining one or more distances including a distance between the sensor and the reference point of the container.

4. The device of claim 1 further comprising a storage unit configured to receive and store the output from the measurement system.

5. The device in claim 4 wherein the storage unit is further configured to store time, date, location, and calibration data from the device.

6. The device of claim 4 further comprising a display unit configured to display information from the device.

7. The device of claim 1 wherein the housing is attachable to the container and wherein the device is configured to be attached to a reference point of the container.

8. The device of claim 1 wherein the device communicates via one or more wireless connections.

9. The device of claim 1 wherein the measurement system determines the volume amount of fluid in the container using cloud computing.

10. A method for determining an amount of fluid in a container having a fluid level, the method comprising:
supplying a non-intrusive portable liquid product measuring device comprising:
a housing,
a read unit configured to read a marker code on the container, the marker code comprising information indicative of a cross-sectional area of the container;
a capacitive sensor supported by the housing and configured to detect one or more fluid levels of the container through the outer surface of the container;
a measurement system comprising a measuring wheel, the measurement system configured to:
receive the cross-sectional area of the container from the read unit,
determine or more distances including a distance traveled by the measuring wheel starting from a reference point on the container and ending at a position above the reference point where the capacitive sensor detects a fluid level of the one or more fluid levels, wherein the reference point is representative of a height at which the container should be refilled or replaced;
determine a volume amount of fluid in the container based on the cross-sectional area of the container, the distance traveled by the measuring wheel from the reference point to the position of the capacitive sensor, and the one or more detected fluid levels of the container, and
output the volume amount of fluid in the container;
placing the measuring device including the measuring wheel at a position that is proximal to or in abutment with an outer surface of the container;
moving the measuring device along the vertical distance of the container;
providing a signal to a user that the measuring device has determined the fluid level of the container; and
outputting the volume amount of fluid in a container based on the cross-sectional area of the container, the distance traveled by the measuring wheel from the reference point to the position of the capacitive sensor, and the one or more detected fluid levels of the container.

11. The method of claim 10 further comprising any of recording, storing, or displaying measuring device information including the output from the measurement system and wherein moving the measuring device along the vertical distance of the container comprises moving the measuring device between a position above the fluid level of the container and a position below the fluid level of the container.

12. A system for non-intrusively measuring a volume of one or more fluids held within a container comprising:
a capacitive sensor supported by a housing configured to detect one or more fluid levels of a container through an outer surface of the container;
a read unit supported by the housing configured to read a marker code on the container, the marker code comprising information including an overall height and a volume of the container;
a measuring wheel supported by the housing configured to contact the container;
a measurement system comprising a processor, the measurement system configured to:
receive the overall height and the volume of the container from the read unit;
receive the one or more detected fluid levels of the container from the capacitive sensor;
determine one or more distances traveled by the measuring wheel starting from a reference point on the container and ending at a position above the reference point where the capacitive sensor detects a fluid level of the one or more fluid levels, wherein the reference point is representative of a height at which the container should be refilled or replaced;
determine a volume of the one or more fluids held in the container using the received overall height and the volume of the container, the one or more fluid levels of the container, and the one or more distances traveled by the measuring wheel; and
output the volume of the one or more fluids held in the container.

13. The system of claim 1, wherein the capacitive sensor and the read unit comprise the same unit.

14. The system of claim 1, wherein the measurement system is configured to determine the amount of fluid in the container further based on a correction factor.

* * * * *